(12) United States Patent
Luo et al.

(10) Patent No.: US 7,823,482 B2
(45) Date of Patent: Nov. 2, 2010

(54) RECLINER REGULATING DEVICE

(75) Inventors: Xianhu Luo, Xiangfan (CN); Zhengkun Huang, Xiangfan (CN)

(73) Assignee: Hubei Aviation Precision Machinery Technology Co., Ltd., Xiangfan, Hubei Province (CN)

( * ) Notice: Subject to any disclaimer, the term of this patent is extended or adjusted under 35 U.S.C. 154(b) by 617 days.

(21) Appl. No.: 11/821,716

(22) Filed: Jun. 25, 2007

(65) Prior Publication Data

US 2008/0196542 A1    Aug. 21, 2008

(30) Foreign Application Priority Data

Feb. 16, 2007    (CN) .................... 2007 1 0079391

(51) Int. Cl.
*F16H 53/00* (2006.01)
(52) U.S. Cl. ........................................ 74/567
(58) Field of Classification Search ............... 74/567, 74/569; 296/65.01; 297/362
See application file for complete search history.

(56) References Cited

U.S. PATENT DOCUMENTS

| | | | | |
|---|---|---|---|---|
| 4,143,905 | A | * 3/1979 | Hensel et al. | ............ 296/65.17 |
| 4,470,633 | A | * 9/1984 | Fourrey et al. | ............. 297/362 |
| 6,007,152 | A | * 12/1999 | Kojima et al. | ........... 297/367 R |
| 6,474,740 | B1 | 11/2002 | Kondo et al. | |
| 7,407,230 | B1 | * 8/2008 | Luo et al. | ................ 297/367 R |

2006/0261657  A1    11/2006  Luo et al.

FOREIGN PATENT DOCUMENTS

| JP | 2001017259 | 1/2001 |
|---|---|---|
| JP | 2004105360 | 4/2004 |
| JP | 2006204896 | 8/2006 |

OTHER PUBLICATIONS

Office Action for Japanese Application No. 2007-147050 dated Mar. 17, 2009.
Written Opinion for corresponding application, FR 0704623, dated Mar. 1, 2009.
Search Report for corresponding application, FR 0704623, dated Mar. 1, 2009.

* cited by examiner

*Primary Examiner*—Vicky A Johnson
(74) *Attorney, Agent, or Firm*—Gardere Wynne Sewell, LLP

(57) ABSTRACT

Described herein is a recliner regulating device comprising a locking cam, an unlocking cam with a thickness less than the locking cam, a ratchet gear, a coulisse and a return spring connected with a central shaft. The locking cam is connected with the unlocking cam. Sliders are connected with the unlocking cam and sliding grooves. A jacket is connected with the ratchet gear and the coulisse. The return spring is connected with the coulisse. The thickness of the locking cam and the unlocking cam may be respectively designed in terms of the stress applied thereon. Since the locking cam and the unlocking cam are separately produced, structure of the die is simplified and service life of the die is improved significantly. The locking cam and the unlocking cam may be manufactured by punch, which leads to a greater production efficiency.

20 Claims, 7 Drawing Sheets

— Prior Art —

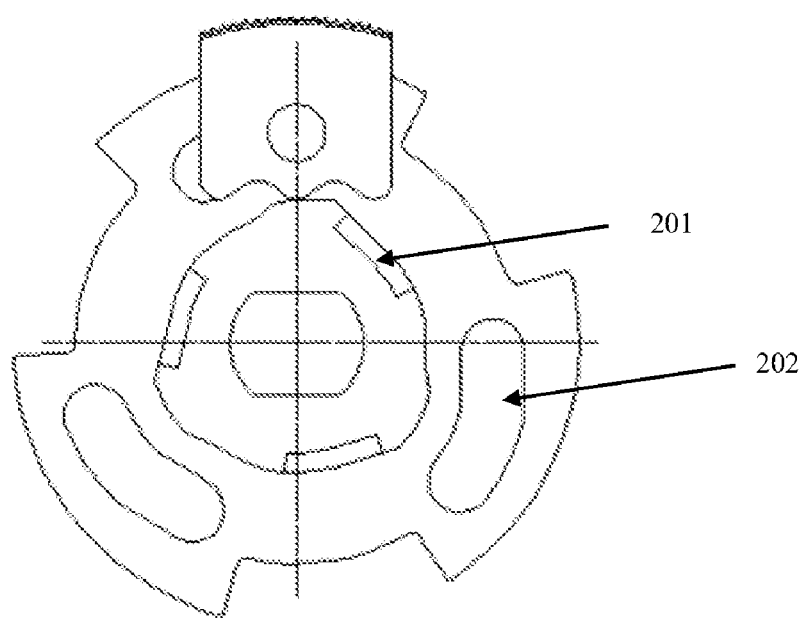
Figure 2   -- Prior Art --
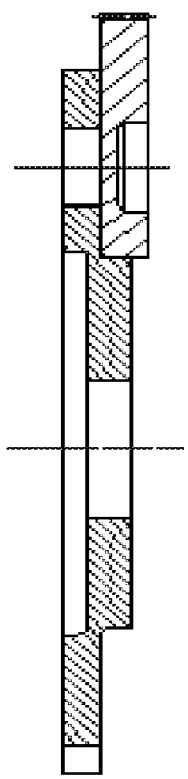
Figure 3   -- Prior Art --

RECLINER REGULATING DEVICE

CROSS-REFERENCES TO RELATED APPLICATIONS

This application claims the benefit of Chinese Application No. 200710079391.0 filed Feb. 16, 2007.

STATEMENT REGARDING FEDERALLY SPONSORED RESEARCH OR DEVELOPMENT

Not applicable.

BACKGROUND OF THE INVENTION

This invention relates to the field of mechanical technology, in particular to a recliner regulating device.

At present, functions of angle-regulating and back's quick-folding may be realized in most of the recliner which then will be locked up after the angle-regulating is completed so as to fix the angle between the recliner seat and the recliner back.

There are mainly two modes to achieve angle-regulating in the prior arts. The first mode is disclosed for example in Chinese Utility Model Patent No. 200420017699.4 titled "Plate spring type armchair angle regulating and back folder nuclear installation". As shown in FIG. 1, two-slider configuration is adopted in this device to realize the angle-regulating. This device possesses the merits of compact conformation and exempt to maintenance. However, because two sliders are adopted in the device, after the central shaft 101 rotates, the sliders 102 will make translation in the sliding grooves toward the circumference of ratchet gear 106 under the action of the return spring 103 until the slider teeth 104 are engaged with the ratchet gear teeth 105 completely. Also, owing to the two-slider configuration adopted, after the slider teeth 104 engage with the ratchet gear teeth 105, the central shaft 101 may not be at the center position due to the effect of the sliders 102. Therefore, the problem is that the engagement between the slider teeth 104 and the ratchet gear teeth 105 is instable.

The second mode is disclosed for example in Chinese Utility Model Patent No. 01250171.9 titled "Core driving device for chair angle regulator". As shown in the FIG. 2 and 3, the cam mechanism of this device includes three sliding grooves and three sliders. The cam mechanism of the device further includes an unlocking part having cam grooves 202 and a locking part having reinforcement ribs 201. The cam grooves 202 and central hole of the cam are produced by punch process. As the intensity of the unlocking part is bigger than that of the locking part, when the entire thickness of the cam meets the locking requirements, intensity margin of the unlocking part is oversized, which leads to an increase of the entire thickness of the device and a bad manufacturability when punching the cam grooves 202 and the central hole. When the punching condition is satisfied, the thickness of the locking part is identical with that of the unlocking part, as shown in FIG. 3. Since the forces applied on the locking part when supporting the sliders are bigger than that applied on the unlocking part, the stress is different. Moreover, it is difficult to manufacture the cam, because the cam has reinforcement ribs and the profile thereof includes a plurality of curved segments. This device adopts an attaching-type configuration, which leads to the structure of the device ponderous and bulky.

SUMMARY OF THE INVENTION

In view of the above, described herein is a recliner regulating device comprising an unlocking cam, a locking cam, sliders having slider teeth, a ratchet gear having ratchet gear teeth, a coulisse having sliding grooves, a return spring, a central shaft and a jacket, wherein the unlocking cam with a thickness less than the locking cam, the locking cam, the ratchet gear, the coulisse and the return spring are connected with the central shaft; the locking cam is connected with the unlocking cam; the sliders are connected with the unlocking cam and the sliding grooves; the jacket is connected with the ratchet gear and the coulisse; and the return spring is connected with the coulisse.

Preferably, the unlocking cam, the locking cam, the ratchet gear, the coulisse, the return spring and the central shaft are connected such that the unlocking cam, the locking cam and the return spring form a shaft connection with the central shaft through their respective square holes, and that the ratchet gear and the coulisse form a shaft connection with the central shaft through their respective round holes.

Preferably, the sliders are connected with the unlocking cam and the sliding grooves such that the sliders are connected through their respective bosses with the respective cam grooves on the unlocking cam and that the sliders are fitted in the sliding grooves in a manner of a clearance fit.

Preferably, the locking cam and the unlocking cam are connected such that the locking cam is connected through its respective semi-punched bosses with the respective holes on the unlocking cam.

Preferably, the ratchet gear has bosses connecting with a connecting plate of the recliner back.

Preferably, the coulisse has bosses connecting with a connecting plate of the recliner seat.

Preferably, the ratchet gear further has ratchet gear sliding surfaces which come into contact with the slider teeth after the unlocking cam and the locking cam are restored through the central shaft under the action of the return spring.

Preferably, the numbers of the sliding grooves and the sliders are three or more than three, respectively.

Preferably, the slider teeth are engaged with the ratchet gear teeth after the unlocking cam and the locking cam are restored under the action of the return spring; and the slider teeth are disengaged with the ratchet gear teeth after the unlocking cam and the locking cam are rotated by the central shaft.

Several advantages of the device according to the invention described include the thickness of the locking cam and the unlocking cam which may be determined separately depending on their subjected stress. It is optimal when the thickness of the unlocking cam is less than that of the locking cam and when the thickness of the locking cam is identical with that of the sliders. In this case, stress on the locking cam and the unlocking cam is balanced most. Meanwhile, since the locking cam and the unlocking cam are manufactured separately and satisfy the punching condition, the production efficiency is significantly improved compared with that of the integral cam.

When adopting three sliding grooves and three sliders, the device enables both the self-centering of the central shaft and the angle locking-up of the recliner, so that engagement between the slider teeth and the ratchet gear teeth are more stable.

Moreover, jacket-type configuration is adopted in the device, which makes its entire structure simple, installation flexible and also makes the device free of maintenance.

Quick-folding of the recliner may be realized at the same time of angle-regulating of the recliner.

BRIEF DESCRIPTION OF THE DRAWINGS

For more complete understanding of the features and advantages of the invention described, reference is now made to a description of the invention along with accompanying figures, wherein:

FIG. 2 is a front view of the cam configuration with three sliders according to prior art;

FIG. 3 is a left view of the cam configuration with three sliders according to prior art;

DETAILED DESCRIPTION OF THE INVENTION

The configuration of the device and the connection relationships among various components of the device are described in detail by way of an embodiment of the invention with reference to the attached drawings.

Figure 1:
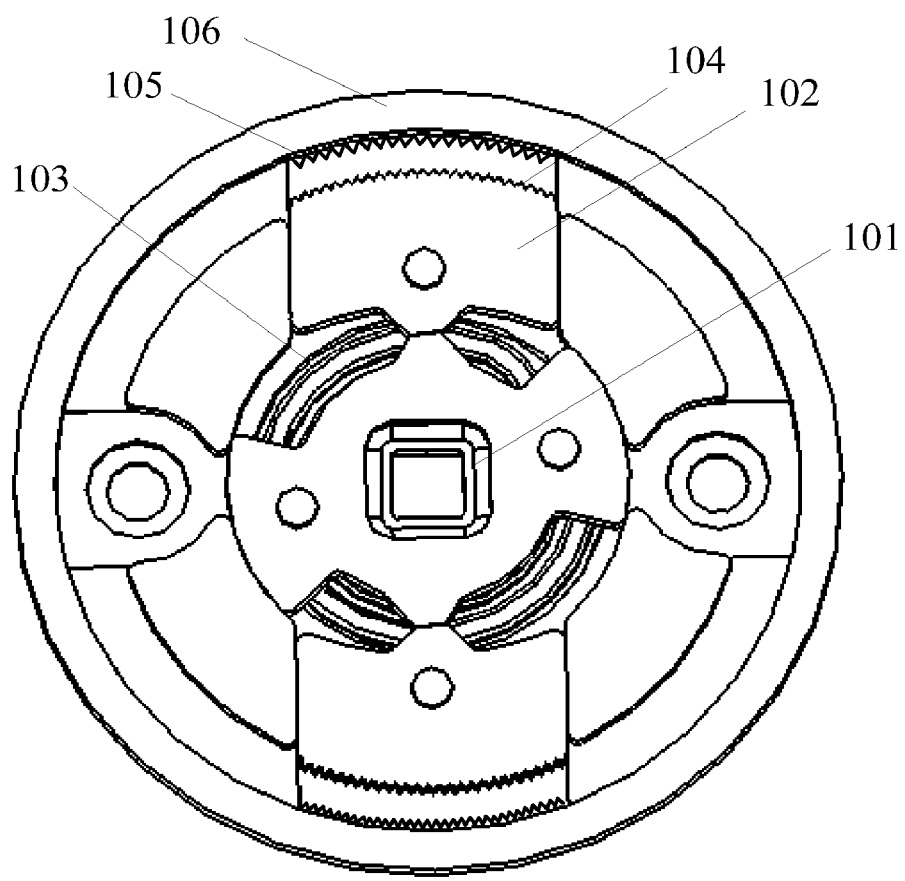
FIG. 1 is a sketch-map of the angle-regulating device for a recliner with two sliders according to prior art.
Figure 4A:
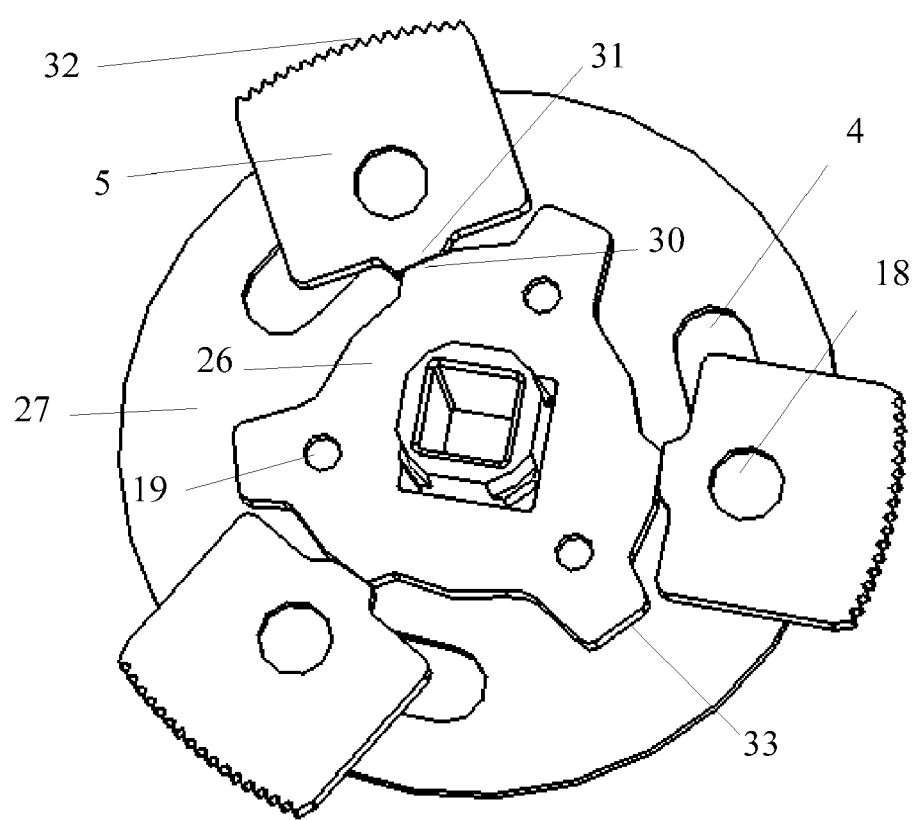
FIG. 4 depicts embodiments described herein including FIG. 4A, which illustrates a front view of a connection between three sliders and a cam, and FIG. 4B, which illustrates a front view of another connection between more than three sliders and a cam.
Figure 4B:
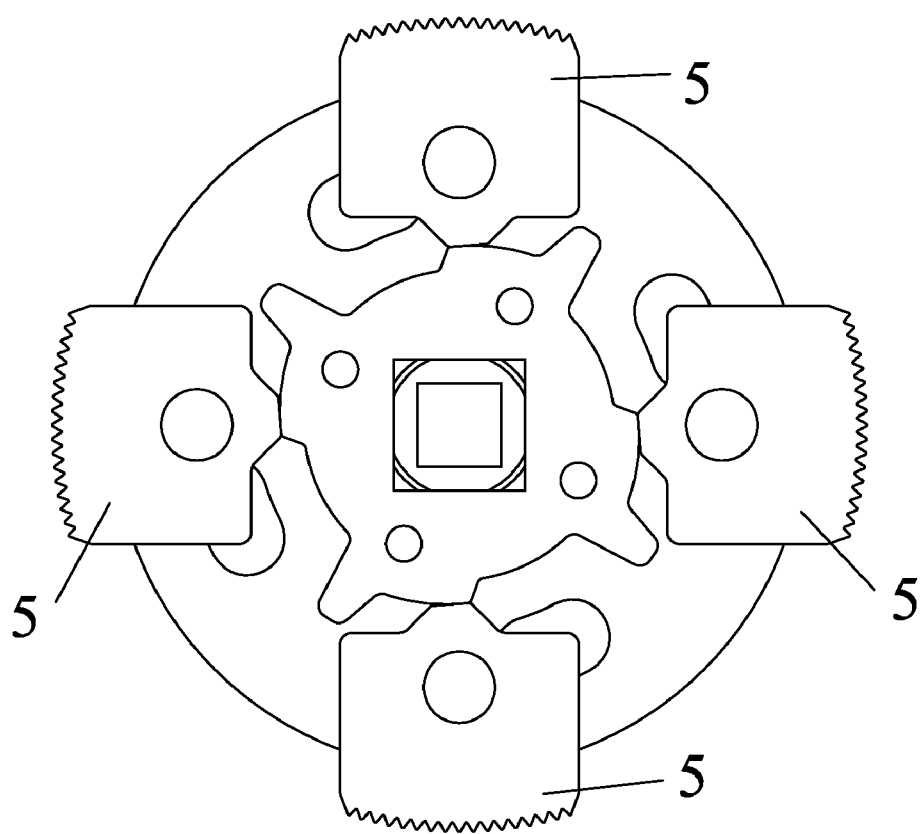
Figure 5:
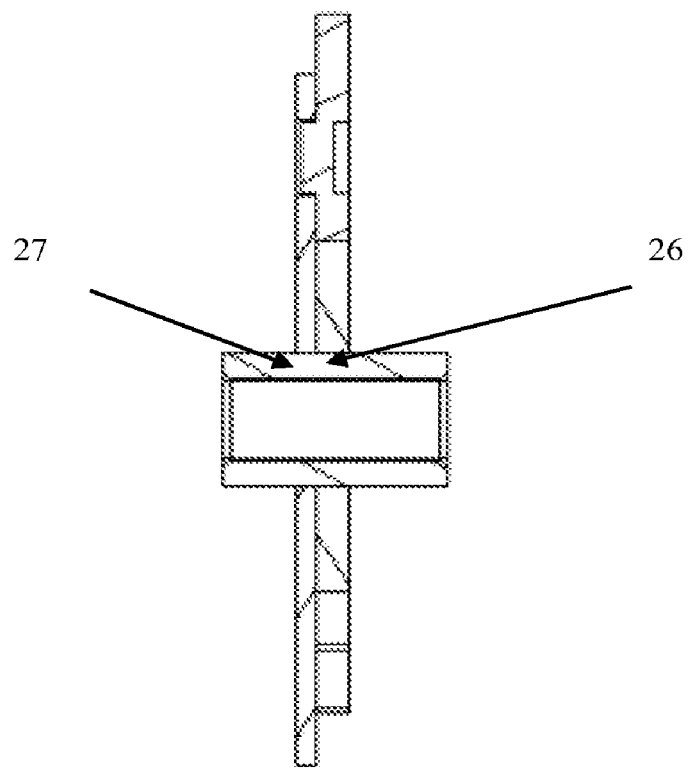
FIG. 5 is a left view of the connection between three sliders and the cam according to an embodiment described herein.
Figure 6:
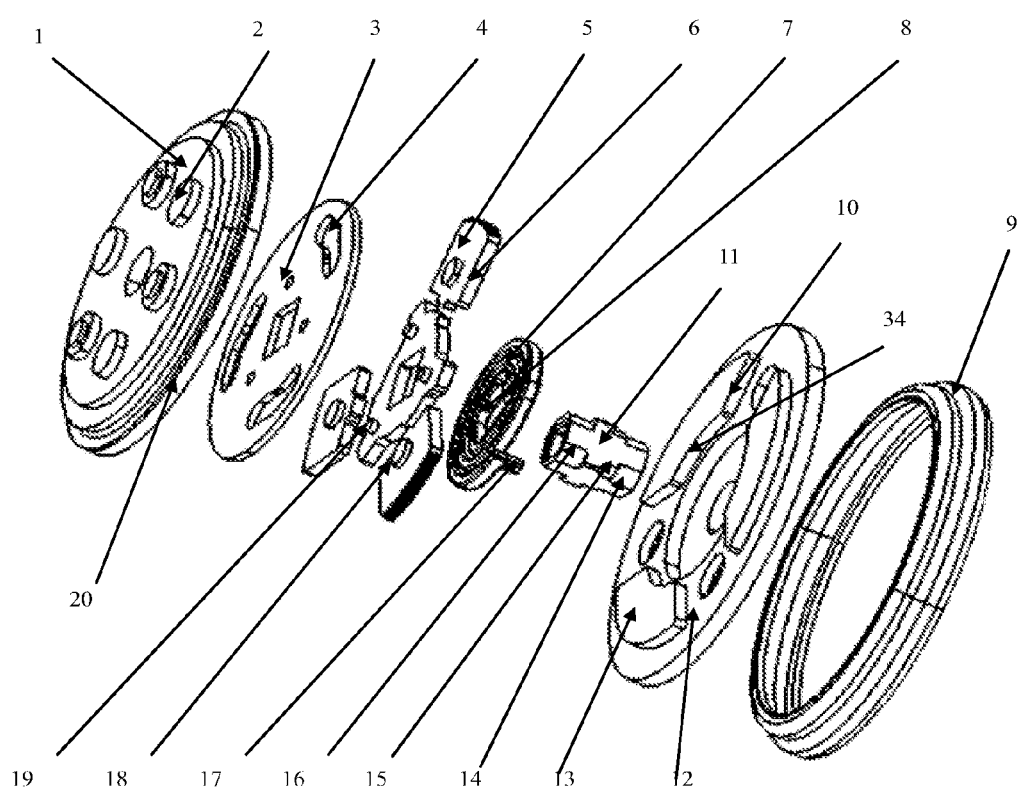
FIG. 6 is an assembling sketch-map according to an embodiment described herein.
Figure 7:
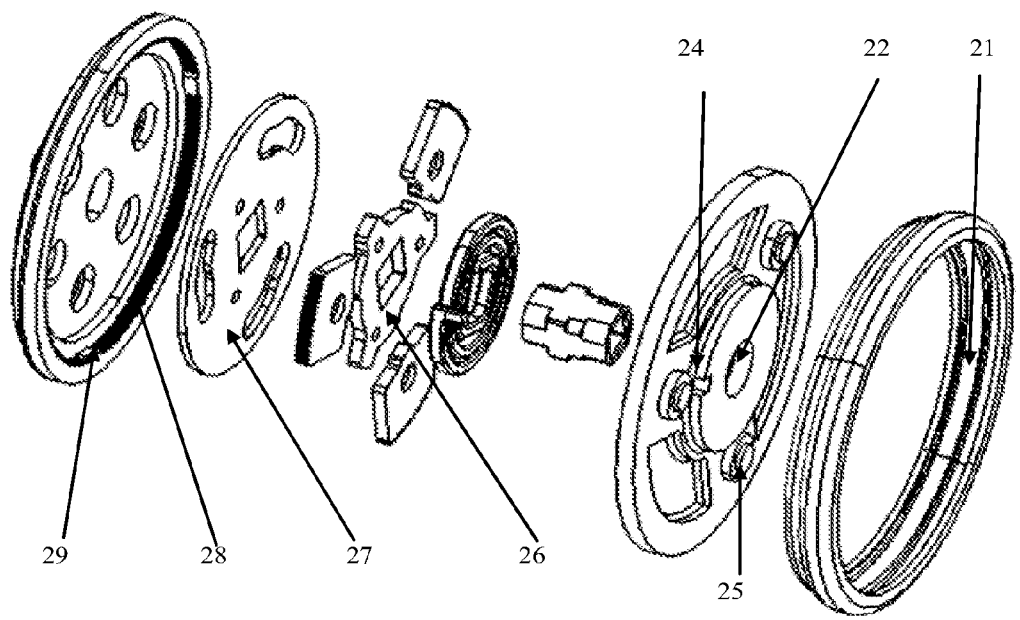
FIG. 7 is a further assembling sketch-map according to an embodiment described herein.

Three sliders are adopted in this embodiment. As shown in FIGS. 4 and 5, a locking cam 26 is connected with an unlocking cam 27 through respective semi-punched bosses 19 on the locking cam 26. Sliders 5 are connected with three symmetrical cam grooves 4 on the unlocking cam 27 through respective semi-punched bosses 18 on the sliders 5. A self-locking is formed between each self-locking surface 31 of the sliders 5 and each self-locking surface 30 of the locking cam 26.

When the angle-regulation of a recliner is realized through the recliner regulating device having the configuration of above mentioned three sliders, engagement between the teeth will become more stable and flexible. The recliner regulating device adopting three sliders will be described in detail with reference to FIG. 4, FIG. 5, FIG. 6 and FIG. 7.

In this embodiment, the recliner regulating device comprises a ratchet mechanism, a cam mechanism, a return spring 7, a central shaft 11 and a jacket 9 connecting the former components. The ratchet mechanism is consisted of a ratchet gear 1 and sliders 5, while the cam mechanism is consisted of an unlocking cam 27, a locking cam 26, a coulisse 13 and sliders 5.

The ratchet gear 1 provides on its back several semi-punched bosses 2, through which the ratchet gear 1 may be connected with a connecting plate of the recliner back. Ratchet gear teeth 28 and ratchet gear sliding surfaces 29 are provided in the inner cavity of the ratchet gear 1. Three sliding grooves 12 are disposed evenly on the coulisse 13. Three sliders 5 are located in the three sliding grooves 12 of the coulisse 13, respectively. A clearance fit is formed between the side surfaces 6 of the sliders 5 and the side surfaces 10 of the sliding grooves 12. Semi-punched bosses 25 on the coulisse 13 may be connected with a connecting plate of the recliner seat.

Each slider 5 provides on its outer side slider teeth 32 which may be engaged with the ratchet gear teeth 28, provides on its inner side a segment of self-locking surface 31, and provides on its middle part a semi-punched boss 18. There are three segments of cam self-locking surfaces 30 corresponding to three slider self-locking surfaces 31 as well as three semi-punched bosses 19 on the locking cam 26. On the unlocking cam 27, there are three cam grooves 4 respectively corresponding to the semi-punched bosses 18 on the middle part of the three sliders 5 simultaneously. Semi-punched bosses 18 on the sliders 5 are connected with the unlocking cam 27 in the cam grooves 4. On the unlocking cam 27, there are three holes 3 connected with three semi-punched bosses 19 on the locking cam 26. Inner hole of the return spring 7 is square in shape. The unlocking cam 27 and the locking cam 26 are directly connected with the outer square part of the central shaft 11 through their inner square holes. External hook 17 of the return spring 7 is fixed in the hole 24 of the coulisse 13. Clearance fits are formed between the curved surfaces 14, 16 on both ends of the central shaft 11 and the central hole 22 of the coulisse 13 as well as the central hole of the ratchet gear 1 respectively. Chamfers 15 are formed on the central shaft 11, which may prevent the interference between the inner square hole 8 and the central shaft 11 when the inner square hole 8 of the return spring 7 is connected with the central shaft 11. Jacket 9 is fixedly connected with the coulisse 13 through clamping. A clearance fit is formed between the inner circumference 21 of the jacket 9 and the outer circumference 20 of the ratchet gear.

After connecting three semi-punched bosses 25 on the coulisse 13 with the connecting plate of the recliner seat and connecting six semi-punched bosses 2 on the ratchet gear 1 with the connecting plate of the recliner back, when an external torque opposite to the direction of return spring 7 is exerted on the central shaft 11, the unlocking cam 27 is moved by the central shaft 11 toward the unlocking direction, which is the counterclockwise direction as shown in FIG. 2. At the same time, three cam grooves 4 bring the three sliders 5 to make translation along the sliding grooves 12 toward the center of the central shaft 11 until the slider teeth 32 are disengaged with the ratchet gear teeth 28 completely. At this time, the ratchet gear 1, which is connected with the recliner back, may rotate freely about the center of the jacket 9 with respect to the coulisse 13 so as to realize the angle-regulation of the recliner. When the angle is regulated to a desired angle, the external torque is released. At this time, the central shaft 11 will rotate clockwise under the acting force of the return spring 7, so that the sliders 5 are urged by the locking cam 26 to make translation along the sliding grooves 12 away from the central shaft 11 until the slider teeth 32 are engaged with the ratchet gear teeth 28 completely. Under this circumstance, a self-locking is formed between the self-locking surface 30 of the locking cam 26 and the self-locking surface 31 of the slider, which locks the recliner back to the desired angle. During the rotation of the locking cam 26, a clearance fit is formed between the curved surfaces 33 of the locking cam 26 and the inner curved surfaces 34 of the coulisse 13. After the slider teeth 32 are engaged with the ratchet gear teeth 28, the central shaft 11 is self-centered so that the engagement between the slider teeth 32 and ratchet gear teeth 28 becomes more stable.

After the central shaft 11 rotates, the recliner back is regulated to a specific angle by the rotation of ratchet gear 1 when the slider teeth 32 are disengaged with the ratchet gear teeth 28. When the slider teeth 32 face to the ratchet gear sliding surfaces 29, the recliner back may be quickly folded in a certain scale so that the quick-folding of the recliner back is fulfilled.

The locking cam 26 has a simple profile in which the procedure of adding a reinforcement rib on the cam is omitted, which facilitates mass production and manufacture. Adoption of the semi-punched bosses 19 for connecting the locking cam 26 with the unlocking cam 27 makes the configuration simple and flexible.

It is still adopted a configuration of three sliders in the embodiment of this device, which enables both locking-up of the recliner after angle-regulating and self-centering of the central shaft 11.

Of course, the device according to the invention is not limited only to the configuration of three sliders. The angle-regulating and locking-up also may be carried out by a configuration of multiple sliders.

The thickness of the locking cam 26 and the unlocking cam 27 may be determined separately depending on their subjected stress. It is optimal when the thickness of the unlocking cam 27 is less than that of the locking cam 26 and when the thickness of the locking cam 26 is identical with that of the sliders 5. In this case, stress on the locking cam 26 and the unlocking cam 27 is balanced most. Meanwhile, since the locking cam 26 and the unlocking cam 27 are manufactured separately and satisfy the punching condition, the production efficiency is significantly improved compared with that of the integral cam.

When adopting three sliding grooves and three sliders, the device enables both the self-centering of the central shaft and the angle locking-up of the recliner, so that engagement between the slider teeth 28 and the ratchet gear teeth 32 are more stable.

Moreover, jacket-type configuration is adopted in the device, which makes its entire structure simple, installation flexible and also makes the device need no maintenance. Quick-folding of the recliner may be realized at the same time of angle-regulating of the recliner.

While the invention has been described above by way of embodiments, the invention is not limited to such embodiments. Various modifications, equivalent substitutions or improvements may be made to the invention without departing from the spirit and scope of the invention as set forth in the appended claims.

What is claimed is:

1. A recliner regulating device comprising
   an unlocking cam (27),
   a locking cam (26),
   sliders (5) having slider teeth (32),
   a ratchet gear (1) having ratchet gear teeth (28),
   a coulisse (13) having sliding grooves (12),
   a return spring (7),
   a central shaft (11) and
   a jacket (9),
   wherein the unlocking cam (27) with a thickness less than the locking cam (26),
   the locking cam (26), the ratchet gear (1), the coulisse (13) and the return spring (7) are connected with the central shaft (11);
   the locking cam (26) is connected with the unlocking cam (27);
   the sliders (5) are connected with the unlocking cam (27) and the sliding grooves (12);
   the jacket (9) is connected with the ratchet gear (1) and the coulisse (13); and
   the return spring (7) is connected with the coulisse (13).

2. The device according to claim 1, wherein the unlocking cam (27), the locking cam (26), the ratchet gear (1), the coulisse (13), the return spring (7) and the central shaft (11) are connected such that the unlocking cam (27), the locking cam (26) and the return spring (7) form a shaft connection with the central shaft (11) through respective square holes, and that the ratchet gear (1) and the coulisse (13) form a shaft connection with the central shaft (11) through respective round holes.

3. The device according to claim 1, wherein the sliders (5) are connected with the unlocking cam (27) and the sliding grooves (12) such that the sliders (5) are connected through their respective bosses (18) with the respective cam grooves (4) on the unlocking cam (27) and the sliders (5) are located in the sliding grooves (12).

4. The device according to claim 1, wherein the locking cam (26) and the unlocking cam (27) are connected such that the locking cam (26) is connected through its respective semi-punched bosses (19) with respective holes (3) on the unlocking cam (27).

5. The device according to claim 1, wherein the ratchet gear (1) has bosses (2) capable of further connecting with the recliner.

6. The device according to claim 1, wherein the coulisse (13) has bosses (25) capable of further connecting with the recliner seat.

7. The device according to claim 1, wherein the ratchet gear (1) further has ratchet gear sliding surfaces (29) which come into contact with the slider teeth (32) after the unlocking cam (27) and the locking cam (26) are restored through the central shaft (11) under the action of the return spring (7).

8. The device according to claim 1, wherein the numbers of the sliding grooves (12) and the sliders (5) are three or more than three, respectively.

9. The device according to claim 1, wherein the slider teeth (32) are engaged with the ratchet gear teeth (28) after the unlocking cam (27) and the locking cam (26) are restored under the action of the return spring (7); and the slider teeth (32) are disengaged with the ratchet gear teeth (28) after the unlocking cam (27) and the locking cam (26) are rotated by the central shaft (11).

10. The device according to claim 1, wherein there is a clearance fit between side surfaces (6) of the sliders (5) and side surfaces (10) of the sliding grooves (12).

11. The device according to claim 1, wherein there is a clearance fit between curved surfaces (14, 16) on ends of the central shaft (11) and a central hole (22) of the coulisse (13).

12. The device according to claim 1, wherein there is a clearance fit between curved surfaces (14, 16) on ends of the central shaft (11) and a central hole (22) of the ratchet gear (1).

13. The device according to claim 1, wherein there is a clearance fit between an inner circumference (21) of the jacket (9) and an outer circumference (20) of the ratchet gear (1).

14. The device according to claim 1, wherein there is a clearance fit between curved surfaces (33) of the locking cam (26) and inner curved surfaces (34) of the coulisse (13).

15. A recliner regulating device comprising
    an unlocking cam (27),
    a locking cam (26),
    sliders (5) having slider teeth (32),
    a ratchet gear (1) having ratchet gear teeth (28),
    a coulisse (13) having sliding grooves (12),
    wherein sliders (5) are located in sliding grooves (12) of the coulisse (13),
    a return spring (7), a central shaft (11) and
a jacket (9),
wherein the unlocking cam (27) with a thickness less than the locking cam (26),
the locking cam (26), the ratchet gear (1), the coulisse (13) and the return spring (7) are connected with the central shaft (11);
the locking cam (26) is connected with the unlocking cam (27);
the sliders (5) are connected with the unlocking cam (27) and the sliding grooves (12);
the jacket (9) is connected with the ratchet gear (1) and the coulisse (13); and
the return spring (7) is connected with the coulisse (13).

16. The device according to claim 15, wherein the unlocking cam (27), the locking cam (26) and the return spring (7) form a shaft connection with the central shaft (11) through respective square holes.

17. The device according to claim 15, wherein the ratchet gear (1) and the coulisse (13) form a shaft connection with the central shaft (11) through respective round holes.

18. The device according to claim 15, wherein the slider teeth (32) are engaged with the ratchet gear teeth (28) after the unlocking cam (27) and the locking cam (26) are restored under the action of the return spring (7).

19. The device according to claim 15, wherein and the slider teeth (32) are disengaged with the ratchet gear teeth (28) after the unlocking cam (27) and the locking cam (26) are rotated by the central shaft (11).

20. The device according to claim 15, wherein the ratchet gear (1) further has ratchet gear sliding surfaces (29) that come into contact with the slider teeth (32) after the unlocking cam (27) and the locking cam (26) are restored through the central shaft (11) under action of the return spring (7).

* * * * *